May 28, 1957  F. H. GOODING  2,794,170
CABLE-TESTING APPARATUS
Filed July 22, 1955
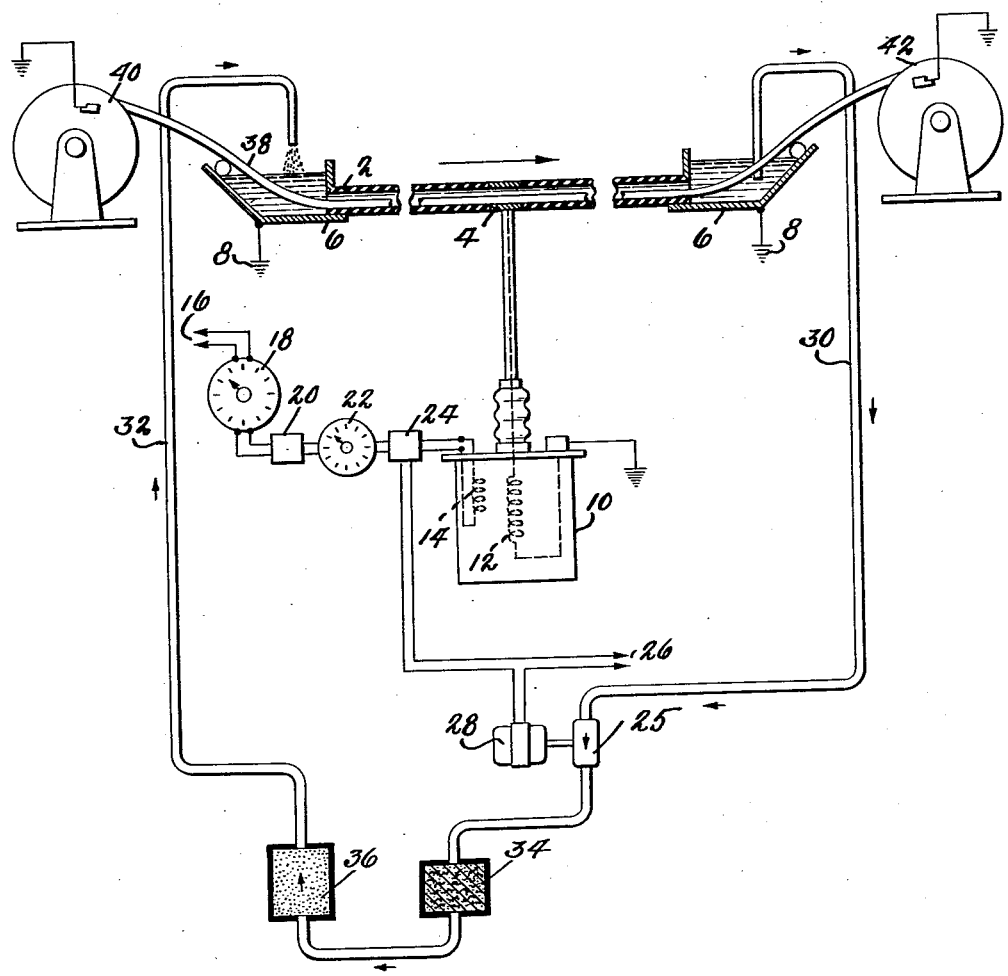
INVENTOR:
FRANCIS H. GOODING
BY James G. Bethell
Attorney.

United States Patent Office 2,794,170
Patented May 28, 1957

2,794,170

CABLE-TESTING APPARATUS

Francis H. Gooding, Lodi, N. J., assignor to The Okonite Company, Passaic, N. J., a corporation of New Jersey Application July 22, 1955, Serial No. 523,836

5 Claims. (Cl. 324—54)

This invention relates to apparatus for testing the insulation of wires and cables for voids and other imperfections.

In my co-pending application Serial No. 376,639, filed August 26, 1953, I disclose a method of and apparatus for testing the insulation of wires and cables for voids and other imperfections wherein the wire or cable being tested is passed continuously through a body of a conducting liquid, such as water, which is connected electrically to a high-voltage source of electricity.

The present invention is an improvement over that invention in that it provides for the automatic initiation of a filtering operation or cycle when the leakage current along the tube in which the water is contained becomes excessive; or stating it in another fashion, whenever the water through which the wire or cable under test is passing continuously becomes excessively conductive due, for example, to conducting impurities collecting therein from the insulation being tested.

In the accompanying drawing, I have shown a layout according to my invention, and, while the invention is related to my co-pending application above referred to, I have omitted for the sake of clarity as much as I could of the equipment shown in the prior application.

Referring to the drawing in detail, 2 designates a tube of insulating material of appreciable length—I have been successfully employing a tube about 20 feet long—equipped midway of its length with an electrically conducting metal sleeve insert 4. A tank 6 is provided at each end of the tube 2. These tanks are in constant communication with the tube 2, and during testing the tanks and tube are kept filled with a semi-conducting liquid, such as distilled water, for example. The tanks are grounded, as shown at 8.

At 10 I have shown a transformer. One side of the secondary 12 of the transformer is connected to the metal sleeve 4 of the testing tube, while the other side of the transformer is grounded.

The primary 14 of the transformer 10 receives its power from a 60-cycle power supply 16, and in the line between the transformer primary and the power supply 16 I provide a current regulator 18, an overload relay 20, an ammeter 22 for registering the amount of current leakage along the tube 2, and a current-limiting relay 24, this relay functioning to close the circuit of a pump motor 28 when the leakage current along the tube 2 becomes excessive, as will be explained more fully hereinafter.

25 designates a water pump, driven by the electric motor 28, the motor receiving its current from current source 26. The circuit of the motor, as will be obvious, is controlled by the relay 24.

The intake side of the pump 25 is connected to one of the tanks 6 through a suitable pipe or conduit 30, while the discharge side of the pump is connected to the other tank 6 through discharge pipe or conduit 32. In this line 32 I provide a mechanical filter 34 and a de-ionizing resin filter 36.

As pointed out in my co-pending application above identified, the insulated wire or cable 38, during testing, is passed from a let-off reel 40 through the semi-conducting liquid in the first tank 6, the tube 2, and the second tank 6 to a wind-up reel 42.

As explained at the outset of this description, one of the objects of my invention is to make provision for filtering and purifying the testing liquid in the tanks and tube when the electrical conductivity of this liquid exceeds a predetermined value, or, in other words, when the leakage current along the tube, which, of course, increases with an increase in the conductivity of the testing liquid, becomes excessive.

It will be seen that with the equipment hereinabove described, when the conductivity of the testing liquid becomes excessive, the current-limiting relay 24, which is connected to the transformer primary 14, will automatically close, thereby closing the circuit of pump motor 28 to drive the pump 25. This will effect circulation of the testing liquid from one of the tanks 6, pipe 30, pump 25, through the mechanical filter 34 and de-ionizing resin filter 36 and pipe 32 back to the other tank 6. Circulation of the testing liquid will continue until the testing liquid has been sufficiently purified to reduce its conductivity to the original predetermined value, whereupon the relay 24 will open automatically, thereby opening the circuit of the pump motor 28, so that the pump 25 will come to rest.

It will be understood that the circulating and purifying of the testing liquid is an intermittent operation, taking place whenever necessary, and in no way interfering with the testing operation. This is of considerable advantage particularly on commercial operation, inasmuch as it avoids draining of the tanks 6 and the tube 2 and refilling of the same with a fresh supply of testing liquid, which of necessity would consume considerable time and require complete stoppage of the testing operation.

It is to be understood that changes may be made in the details of construction and arrangement of parts hereinabove described within the purview of my invention.

What I claim is:

1. Apparatus for detecting and locating imperfections in the insulation of wires and cables, said apparatus comprising, in combination, a tube of insulating material provided intermediate its ends with an electrically conducting section; a grounded tank at each end of said tube in constant communication with said tube; a high-tension transformer having one side of its secondary connected to the conducting section of the tube and the other side of its secondary grounded; a body of a semi-conducting liquid in said tanks and tube; filtering mechanism; a pump for effecting intermittent circulation of said liquid through said filtering mechanism; an electric motor for driving the pump; and current-responsive means in the circuit of the transformer for closing the circuit of said motor when the leakage current along said tube becomes excessive.

2. Apparatus for detecting and locating imperfections in the insulation of wires and cables, said apparatus comprising, in combination, a tube of insulating material provided intermediate its ends with an electrically conducting section; a grounded tank at each end of said tube in constant communication with said tube; a high-tension transformer having one side of its secondary connected to the conducting section of the tube and the other side of its secondary grounded; a body of a semi-conducting liquid in said tanks and tube; filtering mechanism comprising a mechanical filter and a de-ionizing resin filter; an electrically driven pump; and a relay in the primary circuit of said transformer for initiating the operation of said pump to effect circulation of said liquid in a closed circuit through said filters when the electrical conductivity of said liquid becomes excessive.

3. Apparatus for detecting and locating imperfections in the insulation of wires and cables, said apparatus comprising, in combination, a tube of insulating material provided intermediate its ends with an electrically conducting section; a grounded tank at each end of said tube in constant communication with said tube; a high-tension transformer having one side of its secondary connected to the conducting section of the tube and the other side of its secondary grounded; a body of a semi-conducting liquid in said tanks and tube; a relay electrically connected to the primary side of said transformer; filtering mechanism; and an electrically driven pump for effecting circulation of the semi-conducting liquid in a closed circuit through said filtering mechanism, said relay automatically initiating operation of said pump when the said liquid becomes excessively conductive.

4. Apparatus for detecting and locating imperfections in the insulation of wires and cables, said apparatus comprising, in combination, a tube of insulating material provided intermediate its ends with an electrically conducting section; a grounded tank at each end of said tube in constant communication with said tube; a high-tension transformer having one side of its secondary connected to the conducting section of the tube and the other side of its secondary grounded; a body of semi-conducting liquid in said tanks and tube; filtering mechanism; a pump for effecting circulation of the said semi-conducting liquid through the filtering mechanism; an electric motor for driving said pump; and a relay electrically connected to the primary side of said transformer for automatically closing said pump motor circuit when said body of semi-conducting liquid becomes excessively conducting.

5. Apparatus for detecting and locating imperfections in the insulation of wires and cables, said apparatus comprising, in combination, a tube of insulating material provided intermediate its ends with an electrically conducting section; a grounded tank at each end of said tube in constant communication with said tube; a high-tension transformer having one side of its secondary connected to the conducting section of the tube and the other side of its secondary grounded; a body of semi-conducting liquid in said tanks and tube through which the insulated wire or cable is passed continuously when testing; a mechanical filter and a de-ionizing filter; a water pump; an electric motor for driving said pump; and a current-limiting relay electrically connected to the primary side of said transformer, said relay automatically closing the circuit of the pump motor to effect circulation, in a closed circuit, of the semi-conducting liquid through said filters when the liquid becomes sufficiently contaminated excessively to increase its conductivity.

References Cited in the file of this patent
UNITED STATES PATENTS

| | | |
|---|---|---|
| 2,452,624 | Zimmermann | Nov. 2, 1948 |
| 2,460,107 | Slade | Jan. 25, 1949 |